E. W. HEDGES.
PIPE CUTTING AND GROOVING MACHINE.
APPLICATION FILED NOV. 14, 1916.
1,256,556.
Patented Feb. 19, 1918.
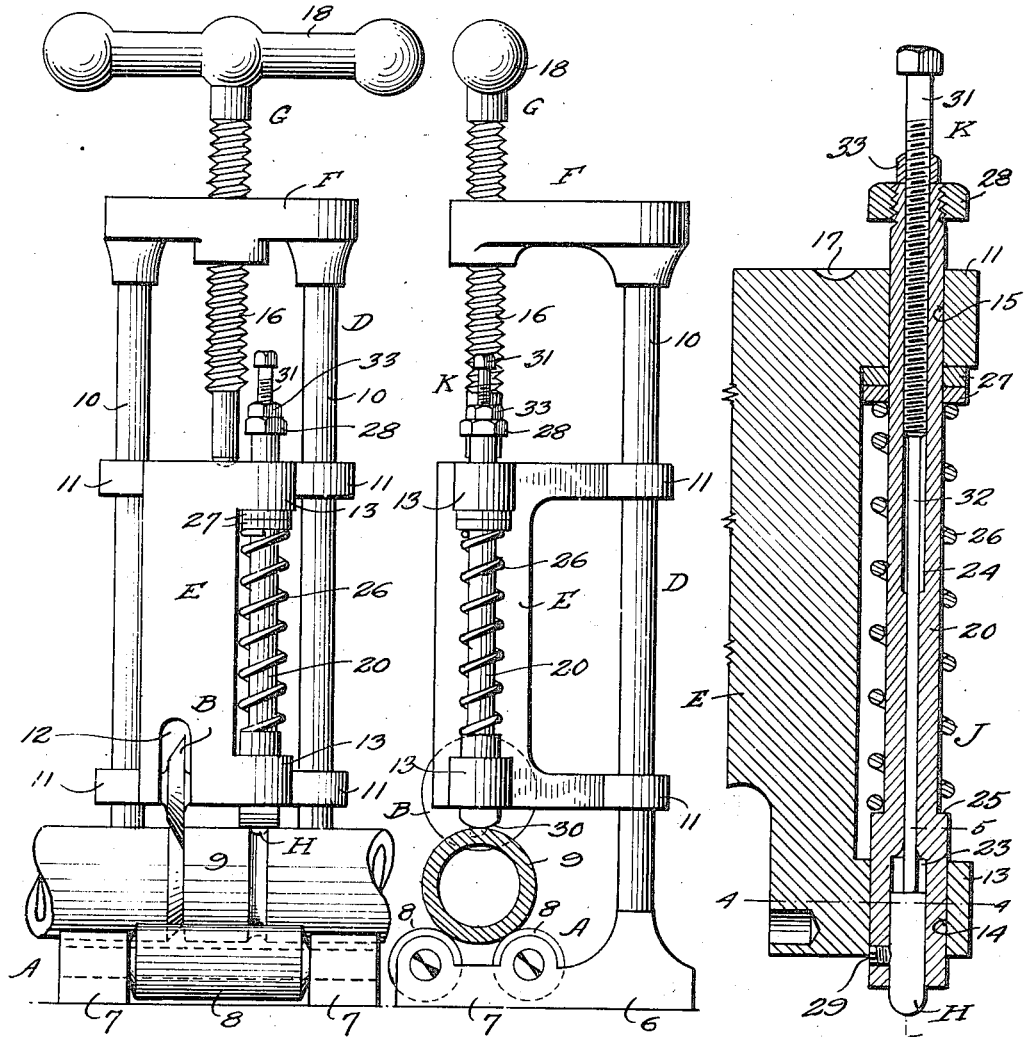
E. W. Hedges
Inventor
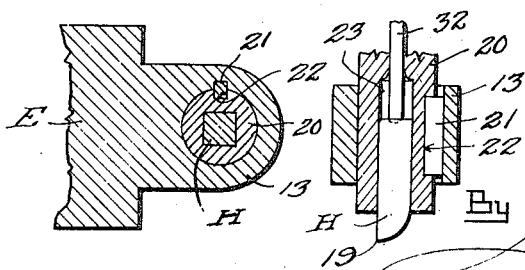
His Attorneys

UNITED STATES PATENT OFFICE.

ERNEST W. HEDGES, OF DETROIT, MICHIGAN.

PIPE CUTTING AND GROOVING MACHINE.

1,256,556.　　　　　Specification of Letters Patent.　　Patented Feb. 19, 1918.

Application filed November 14, 1916. Serial No. 131,257.

*To all whom it may concern:*

Be it known that I, ERNEST W. HEDGES, a citizen of the United States, and a resident of Detroit, in the county of Wayne and State of Michigan, have invented a certain new and useful Improvement in Pipe Cutting and Grooving Machines, of which the following is a specification.

My present invention relates to a pipe cutting and grooving machine, well adapted to act upon pipes for electric wiring or those for conveying the voice, to adapt them to form a part of the system shown in my copending application for patent of the United States, Serial No. 93,743, filed April 26th, 1916.

The principal objects of my invention are to provide a machine whereby the cutting and grooving of the pipes may be accomplished simultaneously; machines of the character described which are adjustable to act upon various sizes of pipes; and, machines of such character that the groove is formed in all parts at uniform distance from its finished end.

Other objects of my invention are to provide means whereby a groove may be formed in the pipe, said means adjustable to provide grooves of different depths; and, means of the character described which may act in conjunction with a pipe-cutting tool but yieldable so that after the groove has been formed, if it is found necessary to advance the cutting tool farther into the body of the pipe, this may be accomplished without interference by the grooving means.

Further objects of my invention will appear in the following detailed description, taken in connection with the accompanying drawing, forming a part of this specification, and in which drawing:

Figure 1 is a front elevation of a machine embodying my invention.

Fig. 2 is a side elevation of the same.

Fig. 3 is an enlarged central vertical sectional view through a carriage, and mechanism for yieldably supporting the grooving tools therefrom.

Fig. 4 is a sectional view on the line 4—4 of Fig. 3.

Fig. 5 is a sectional view on the line 5—5 of Fig. 3.

In the drawing, where similar characters refer to similar parts throughout the several views, A designates an anti-friction abutment for the pipe; B a pipe cutter or cutting tool; C means for feeding the cutter toward base A and in the example shown comprising guide D, carriage E, support F, and feed screw G, in screw-threaded engagement with support F and acting upon carriage E; H a groove cutting tool; J mechanism for yieldably supporting said tool H from carriage E; and, K means for adjusting said tool K with respect to mechanism J.

The machine may be used either when secured to a base, under which conditions the pipe is rotated, or the machine may be manually or otherwise moved circumferentially of the pipe, the pipe being rigid.

Referring first to the abutment A, in the example shown, it comprises a base 6 including spaced arms 7, between which extend elongated rollers 8, the pipe 9 being in line contact with the rollers longitudinally thereof as is clearly shown in Figs. 1 and 2 of the drawing. The guide D may consist of two parallel rods 10 extending from base 6 and held in rigid spaced relation at their ends opposite to said base as by the support F. The carriage E is reciprocable longitudinally of the rods 10 and is guided thereby as by being provided with arms 11 which embrace the rods 10. A recess 12 is provided to accommodate the cutting tool B which is revolubly mounted with its axis transversely of carriage E. The carriage is also provided with lateral extensions 13 having bores 14 and 15, the axis common to both bores extending longitudinally of the carriage E. As to the feed screw G, its shank 16 is in screw-threaded engagement with the support F, the end of the shank extending into a socket 17 in carriage E. The feed screw may be provided with a handle 18 to facilitate rotation thereof. Thus, by rotating the handle 18 clockwise in the example shown, the carriage E will be forced toward the abutment A. Movement of the handle 18 in a counter direction will permit the carriage to be moved away from abutment A, to facilitate the placing of the pipe 9 in operative relation to said abutment.

Referring now to the groove cutting tool H, it is preferably polygonal in cross section, as is clearly shown in Fig. 4 of the drawing, and its cutting edge may be of any suitable shape according to the groove formation desired. In the example shown, it is rounded transversely, and recedes from its cutting edge 19. While I have herein shown the preferred type of groove cutting tool, it is to be understood that any suitable tool may be used, such as a gouge.

In order that the cutting tool B may be fed toward the pipe after the groove cutting tool has served its purpose, mechanism J is provided, preferably including a member 20 reciprocable longitudinally and independently of carriage E, as by sliding in bores 14 and 15 of extensions 13. If this member 20 is circular in cross section, a key 21 may be carried by one of the extensions 13 entering a longitudinal groove 22 in the member. Said member is provided with a socket 23, a longitudinal way 24 open at the inner end of socket 23, and an abutment 25 at its end portion adjacent to the socket 23. In addition to member 20, the mechanism J may comprise a spring 26 encircling the member and engaging abutment 25, and a plurality of washers 27 in engagement with one of the extensions 13, the spring 26 being under compression. A device 28, such as a nut, may be turned upon the member 20 at its end opposite to that end contained in socket 23, so as to limit the movement of member 20 responsive to spring 26. A set-screw 29 may be also provided to retain the groove cutting tool 8 in an adjusted position. It is also preferred to round the member 20 laterally of the tool H, as indicated at 30 in Fig. 2, so as to not disrupt the surface of the pipe after the tool has penetrated the body thereof the desired distance.

It is to be noted that the cutting tool B may be in fixed relation with respect to carriage E, whereas the grooving tool H is yieldably supported by said carriage. Thus, if the machine is used in a manner so as to move the carriage rapidly toward the work, with respect to the speed of rotation of the work, or the machine about the work, the cutting tool may penetrate the work for severing the same, there being less friction in cutting than in grooving, but the grooving tool may, through the yielding of spring 26, accommodate itself to the work so as to provide a smooth groove without chipping, since the degree of penetration of said grooving tool is not at all times gaged by manipulation of the feed screw G.

As the tool H wears down or should adjustment be desirable for any reason whatever, the means K is operated, comprising a screw 31 including a stem 32 movable in way 24, and engaging the inner end portion of tool H; and a set nut 33 in screw-threaded engagement with the shank of screw 31 and adapted to be turned tight against the end portion of member 20, the shank of the screw being in screw-threaded engagement with said member in way 24. By releasing the nut 33, the stem 32 may be fed in way 24 so as to force the tool H outwardly of its socket, the set-screw 29 having been first released. After the desired adjustment has been obtained, the set-screw 29 is turned tight as well as the nut 33.

The operation of the machine is as follows:—

By manipulating the feed screw G, the carriage E may be moved remote from abutment A to facilitate the placing of pipe 9. If the carriage E has not been moved sufficiently to permit the placing of the pipe in operative relation to the abutment, because of engagement with the tool H, the member 20 may be moved manually from an inert position against action of the spring 26, the tool H being permitted to engage the pipe responsive to spring 26 after the pipe is in place. The feed screw G may then be manipulated to feed the carriage E toward the abutment until the cutting tool B engages the periphery of the pipe. The pipe may then be moved circumferentially, or the machine may be bodily moved about the pipe as desired, the feed screw G being manipulated during the operation so as to feed the tools into the body of the pipe.

While I have herein shown the pipe grooving mechanism as carried by extensions of the carrier E, it is to be understood that the grooving mechanism may be applied to cutting machines other than that shown in the drawing, and that changes in details may be made without departing from the spirit or scope of my invention.

I claim:—

1. A pipe cutting and grooving machine comprising in combination, an abutment for the pipe, a cutting tool, a carriage for said cutting tool, a grooving tool, means for yieldably supporting said grooving tool from said carriage, and a device for moving said carriage toward said abutment.

2. A pipe cutting and grooving machine comprising in combination, an abutment for the pipe, a cutting tool, a carriage for said cutting tool, a grooving tool, means for adjustably and yieldably supporting said grooving tool from said carriage, and a device for moving said carriage toward said abutment.

3. In a pipe grooving machine, the combination of an abutment for the pipe, a carriage, a grooving tool, a device for moving said carriage toward said abutment, and mechanism for yieldably supporting said tool from said carriage.

4. In a pipe grooving machine, the combination of an abutment for the pipe, a carriage, a grooving tool, a device for moving said carriage toward said abutment, and mechanism for yieldably and adjustably supporting said tool from said carriage.

5. In a pipe grooving machine, the combination of an abutment for the pipe, a carriage, a member provided with a socket, said member carried by said carriage and reciprocable independently thereof toward and from said abutment, a device for limiting the amplitude of movement of said member toward said abutment, a spring for normally forcing said member toward said abutment, and a grooving tool in said socket.

6. In a pipe grooving machine, the combination of an abutment for the pipe, a carriage, a member provided with a socket, said member carried by said carriage and reciprocable independently thereof toward and from said abutment, an adjustable device for limiting the amplitude of movement of said member toward said abutment, a spring for normally forcing said member toward said abutment, and a grooving tool in said socket.

7. In a pipe grooving machine, the combination of an abutment for the pipe, a carriage, a member provided with a socket open at one end thereof and rounded laterally at opposite sides of said socket, said member carried by said carriage and reciprocable independently thereof toward and from said abutment, a device for limiting the amplitude of movement of said member toward said abutment, a spring for normally forcing said member toward said abutment, and a grooving tool in said socket.

8. In a pipe grooving machine, the combination of an abutment for the pipe, a carriage, a device for moving said carriage toward said abutment, a grooving tool, mechanism for supporting said tool from said carriage, and including a member provided with a socket and way open to the inner end of said socket, and a stem adjustable in the said way of said member adapted to act upon said tool to adjust the protuberance thereof from its socket.

ERNEST W. HEDGES.